US006438548B1

United States Patent
Grim, III et al.

(10) Patent No.: US 6,438,548 B1
(45) Date of Patent: Aug. 20, 2002

(54) METHOD OF AND SYSTEM FOR MANAGING DOCUMENTS IN A BANDWIDTH CONSTRAINED ENVIRONMENT

(75) Inventors: Clifton E. Grim, III, Seabrook; Brian N. Marquette, League City; Christopher B. Plock, Webster; Mark B. Stevens, Houston; Michael Lindsey Williams, Seabrook; John D. Wilson, Houston, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,180

(22) Filed: Jun. 30, 1999

(51) Int. Cl.[7] .................................................. G06F 7/00
(52) U.S. Cl. ........................................... 707/8; 707/201
(58) Field of Search ....................................... 707/8, 100

(56) References Cited

U.S. PATENT DOCUMENTS

| | | | |
|---|---|---|---|
| 4,774,513 A | 9/1988 | Bonnaval-Lamothe et al. | 340/825.34 |
| 5,251,315 A | 10/1993 | Wang | 395/600 |
| 5,454,108 A * | 9/1995 | Devarakonda et al. | 395/650 |
| 5,490,270 A * | 2/1996 | Devarakonda et al. | 395/600 |
| 5,535,375 A * | 7/1996 | Eshel et al. | 391/500 |
| 5,537,645 A | 7/1996 | Henson et al. | 395/650 |
| 5,628,005 A | 5/1997 | Hurvig | 395/608 |
| 5,734,898 A * | 3/1998 | He | 395/619 |
| 5,892,513 A | 4/1999 | Fay | 345/357 |
| 5,956,712 A * | 9/1999 | Bennett et al. | 707/8 |
| 6,240,414 B1 * | 5/2001 | Beizer et al. | 707/8 |
| 2001/0044805 A1 * | 11/2001 | Multer et al. | 707/201 |

OTHER PUBLICATIONS

IBM TDB v41 n1 01–98 pp. 671–674.

* cited by examiner

Primary Examiner—Safet Metjahic
Assistant Examiner—Cam-Linh T. Nguyen
(74) Attorney, Agent, or Firm—Karl O. Hesse

(57) ABSTRACT

A system for managing documents in a distributed computing environment, which may be bandwidth limited, includes a document locker server and a document locker client. The document locker client monitors user interaction with a version of a document locally replicated from a document server. Whenever the user attempts interaction with the document, such as editing or performing a workflow action, which would change said document, the document locker client requests a lock for the document from the document locker server. The document locker server grants a lock if the document is not already locked by another user and the document locally replicated is the latest version of the document. The document locker client allows the user to perform the operation if a lock is received, without having to replicate a version of the document to the local host.

5 Claims, 4 Drawing Sheets

METHOD OF AND SYSTEM FOR MANAGING DOCUMENTS IN A BANDWIDTH CONSTRAINED ENVIRONMENT

FIELD OF THE INVENTION

The present invention relates generally to the field of managing documents in a distributed system, and more particularly to a method of and system of managing documents in a distributed system that may be bandwidth constrained.

DESCRIPTION OF THE PRIOR ART

In a document based database system, such as Lotus Notes™, functionality is provided for users to replicate, i.e. have local copies of, documents from the document server. The user can read or update documents locally and then synchronize the changes back to the document server. This functionality enables a disconnected user to be able to use documents locally. This is a performance benefit for the user since document access is faster due to the document being stored locally. However, this benefit is not achieved without also having some problems.

One of problems associated with document management systems of the prior art is maintaining the synchronization of documents. If multiple users replicate the same document and more than one of the users make changes to the document, when they send the changed documents back to the server, there will be conflicts. Currently, Lotus Notes™ deals with this problem by saving each conflict as a different document and then allowing an administrator, or user, to resolve the conflicts and merge the data into one document.

In environments, such as a LAN or WAN, where all users have a high bandwidth connection to the server, the users can access and edit a document directly on the server. Thus, in such environment, users do not have the local replication and conflict problem. Users can have a "save conflict" problem if two users edit the same document at the same time. In environments where users have no connectivity, i.e. they connect to the LAN, replicate the document, and then disconnect, the local replication and conflict problem cannot be addressed because the various user client machines have no way to be aware of each other.

In systems that have limited bandwidth connectivity, such as radio frequency (RF) networks frequently found in a mobile work environments such as law enforcement, the prior art requires a choice between avoiding conflicts by accessing the server directly, or using replication to bring down documents locally. In a limited bandwidth environment, direct access to the server provides unacceptable performance. Local replication provides improved performance, but it leads to conflicts for documents that have been edited by more than one user.

It is an object of the present invention to overcome the shortcomings of the prior art by providing a system and method by which users can have documents locally so as to have improved performance, and at the same time protect against users editing the same documents at the same time and causing conflicts.

SUMMARY OF THE INVENTION

The present invention provides a method of and system for managing documents in a distributed computing environment, which may be bandwidth limited. The system of the present invention includes a document locker server and a document locker client. The document locker client monitors user interaction with a version of a document locally replicated from a document server. Whenever the user attempts interaction with the document, such as editing or performing a workflow action, which would change said document, the document locker client requests a lock for the document from the document locker server. The document locker server grants a lock if the document is not already locked by another user and the document locally replicated is the latest version of the document. The document locker client allows the user to perform the operation if a lock is received.

The document locker client requests a lock by sending a lock request to the document locking server. The lock request includes a document identifier and a version identifier. The document locker server determines if the document is already locked by another user by checking a locked document table. The locked document table includes, for each locked document, a document identifier, a version identifier, a lock identifier, and the user by whom said document is locked. If the document is already locked by another user, the document locker server sends a "document locked by another user" reply to the document locker client. The document already checked reply may include the identity of the user to whom the document is checked out.

If the document is not already locked by another user, the document locker server determines if the version of the document locally replicated is the same as the version stored on the document server. If the version of the document stored on the document server is newer than the version locally replicated, the document locker server informs the user that a newer version of the document exists, the document locker client prompts the user to replicate the newer version from the document server. If the version of the document locally replicated is the same as the version stored on the document server, the document locker server locks the document by sending a "lock granted" reply to the document locker client and making an entry for the document in the locked document table. Thus, if the user already has the latest version of the document, the system does not replicate another copy of the document to the local host. The lock granted reply includes a unique lock identifier and the entry in the locked document table includes the lock identifier. The document locker client inserts the lock identifier into the locally replicated document.

The document locker server unlocks documents when a locked document is sent back to the document server. Periodically, the document locker server compares lock identifiers for the documents in the document locker server against the lock identifiers inserted in the versions of the documents stored on the document server. If the lock identifier in a document stored on the server is the same as the lock identifier in the locked document table, the document locker server deletes the entry for the document in the locked document table.

DESCRIPTION OF THE PREFERRED EMBODIMENT

Figure 1:
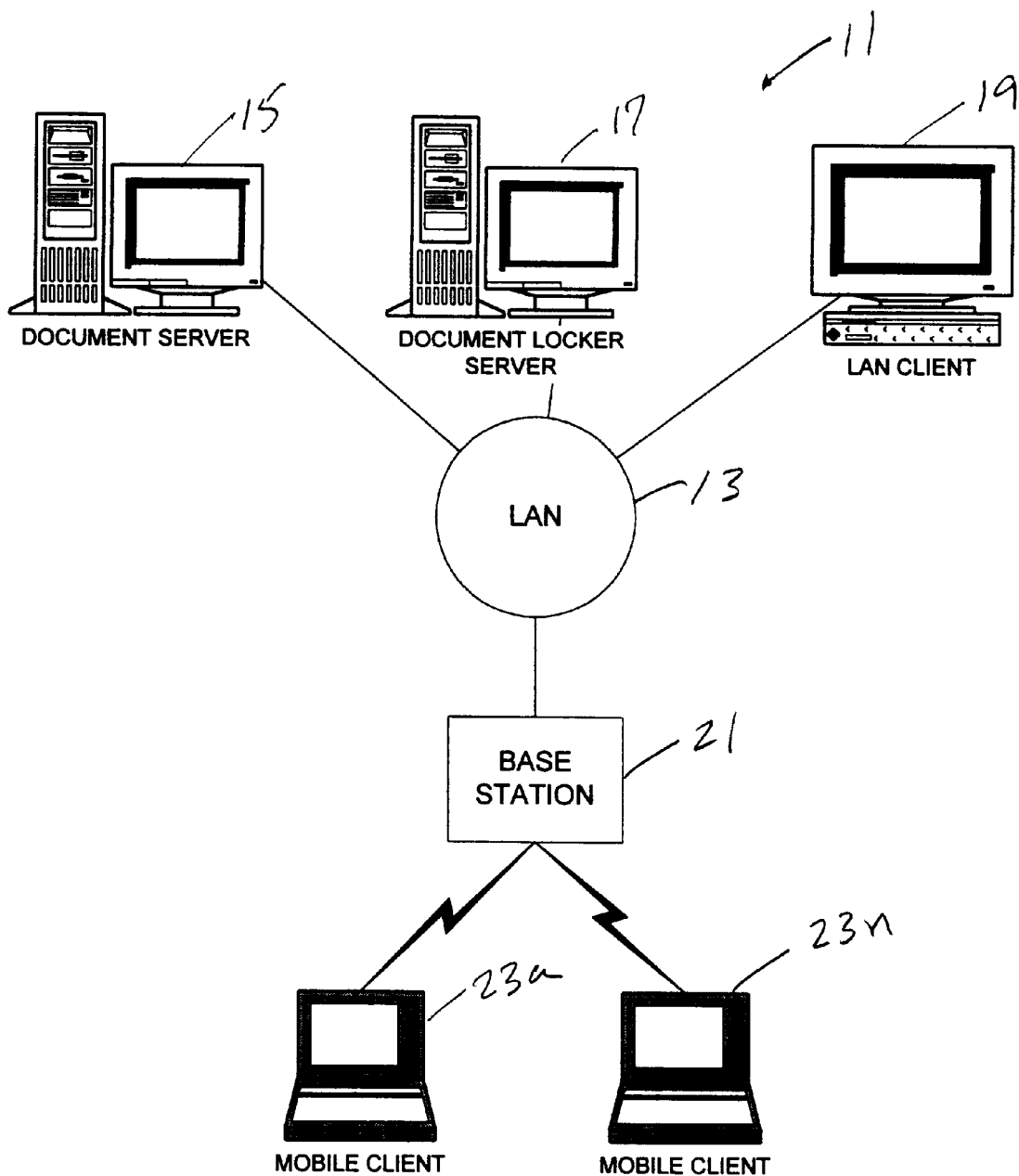
FIG. 1 is a block diagram of a system according to the present invention.

Referring now to the drawings, and first to FIG. 1, the system according to the present invention is designated generally by the numeral 11. System 11 includes a high bandwidth network backbone indicated generally by local area network (LAN) 13. As is well known to those skilled in the art, a high bandwidth network may be implemented in various topologies with various communications protocols. The high bandwidth network backbone can be, in addition to a local area network, a wide area network (WAN), an intranet, or even the Internet.

System 11 includes a document server 15 connected to LAN 13. Document server 15 may be a Lotus Note™ server implemented in a personal computer or workstation. According to the present invention, system 11 includes a document locker server 17. As will be explained in detail hereinafter, document locker server 17 is responsible for managing the locking of documents in system 11. Document locker server 17 is preferably implemented in personal computer or workstation.

System 11 may include one or more LAN clients 19. LAN clients 19 are physically connected to the high bandwidth backbone provided by LAN 13. LAN clients 19 include a text processing application, such as a Lotus Notes™ client, and a document locker client application according to the present invention. The document locker client of the present invention cooperates with document locker server 17. LAN clients 19 are typically implemented in personal computers located at fixed network addresses within an organization.

System 11 includes an interface to a low bandwidth network. In the embodiment of FIG. 1, the interface is provided by one or more base stations 21 physically connected to the high bandwidth backbone provided by LAN 13. As is well known to those skilled of the art, base station 21 includes radio frequency (RF) transceivers that are adapted to communicate with mobile units. In the embodiment FIG. 1, the mobile units include a plurality of mobile clients 23. As described with respect to LAN clients 19, mobile clients 23 include a text processing application, such as a Lotus Notes™ client, and a document locker client application according to the present invention. Mobile clients 23 may be implemented in portable or notebook PCs with RF transceiver interfaces. Additionally, mobile clients may be implemented in units installed within police cars, or personal communication devices.

Figure 2:
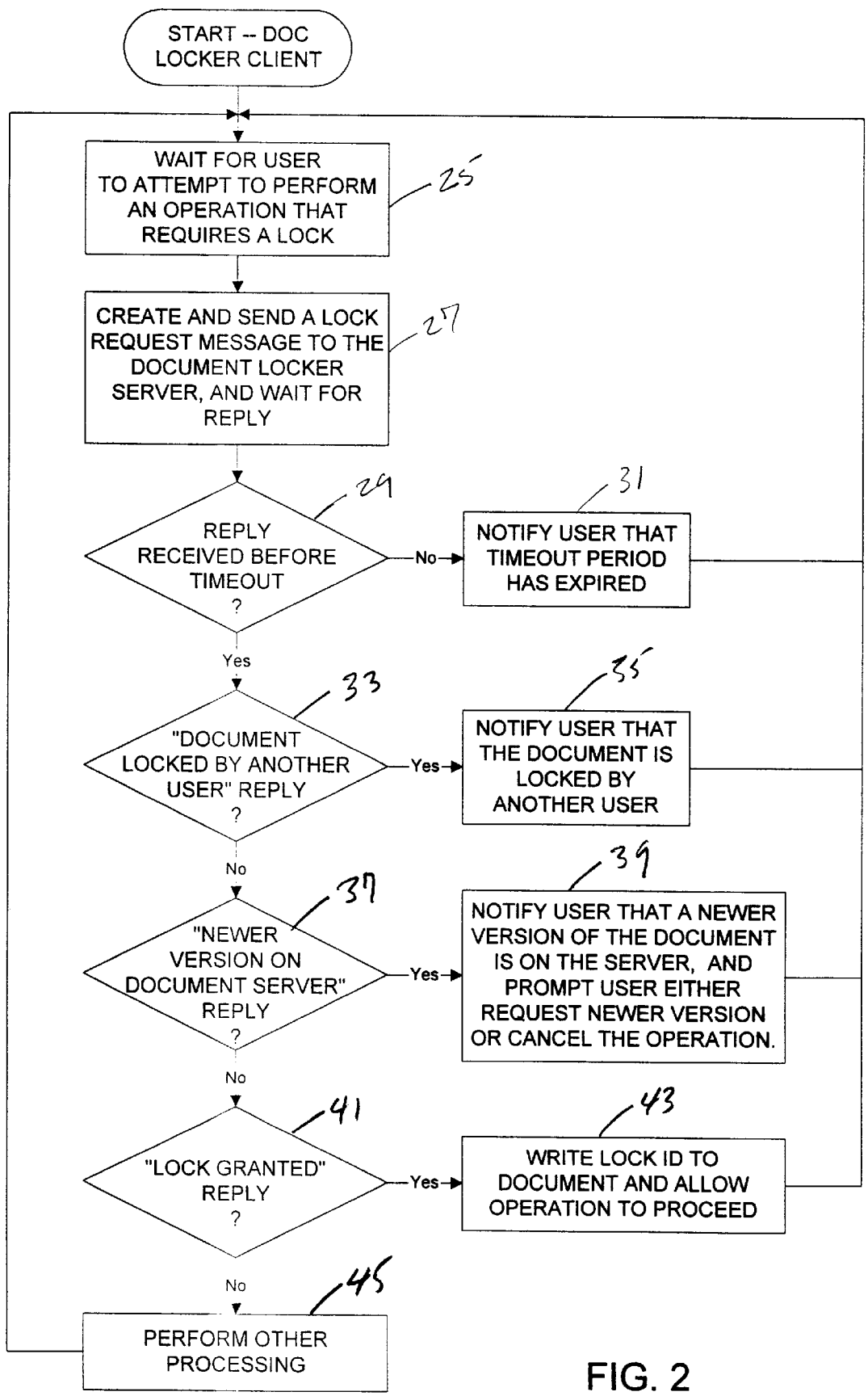
FIG. 2 is a flowchart of document locker client processing according to the present invention.

Referring now to FIG. 2, there is shown a flowchart of document locker client processing according to the present invention. The document locker client monitors user interaction with a document that has been locally replicated from the document server to a host machine. The document locker client waits for the user to attempt to perform an operation with the a processing application that requires a lock, at block 25. An operation that requires a lock is one that changes a document, such as an edit or a workflow operation. When the user attempts to perform an operation that requires a lock, the document locker client creates and sends a lock request message to the document locker server, and waits for reply, at block 27. The lock request message preferably includes the name of the database that the document is, a unique identifier for the document, and a version identifier for the document, as well as appropriate routing information. The lock request message is small and it travels quickly over the bandwidth limited connection.

The document locker client of the present invention preferably starts a timer when the lock request message is sent. If, at decision block 29, a reply is not received before the timer times out, the document locker client notifies the user that the timeout period has expired, at block 31. Preferably, notifications to the user according to the present invention are by message boxes in a graphical user interface. The user can be prompted to send the request again, or cancel the operation. If enabled, the user may be allowed to continue with the operation.

If a reply is received by the document locker client before timeout, the document locker client processes the reply. If, at decision block 33, the reply is that the document already locked by another user, the document locker client notifies the user, at block 35. The reply from the document locker server may include the identity of the other user so that the user attempting to alter the document may contact the other user and request that the other user return of the document to the document server and allow the lock to be released, as will be explained in detail hereinafter. If, at decision block 37, the reply from the document locker server is that a newer version of the document exists on the document server, the document locker client notifies the user and prompts the user either to request the newer version or cancel the operation, at block 39. If, at decision block 41, the document locker client receives a lock granted reply, the document locker client writes the lock identifier received with the reply to the document, and allows the operation to proceed, at block 43. The lock identifier is a string that uniquely identifies the lock. If, at decision lock 41, the reply is not a lock granted reply, the document locker client performs other processing, such as error processing, as indicated generally at block 45.

Figure 3:
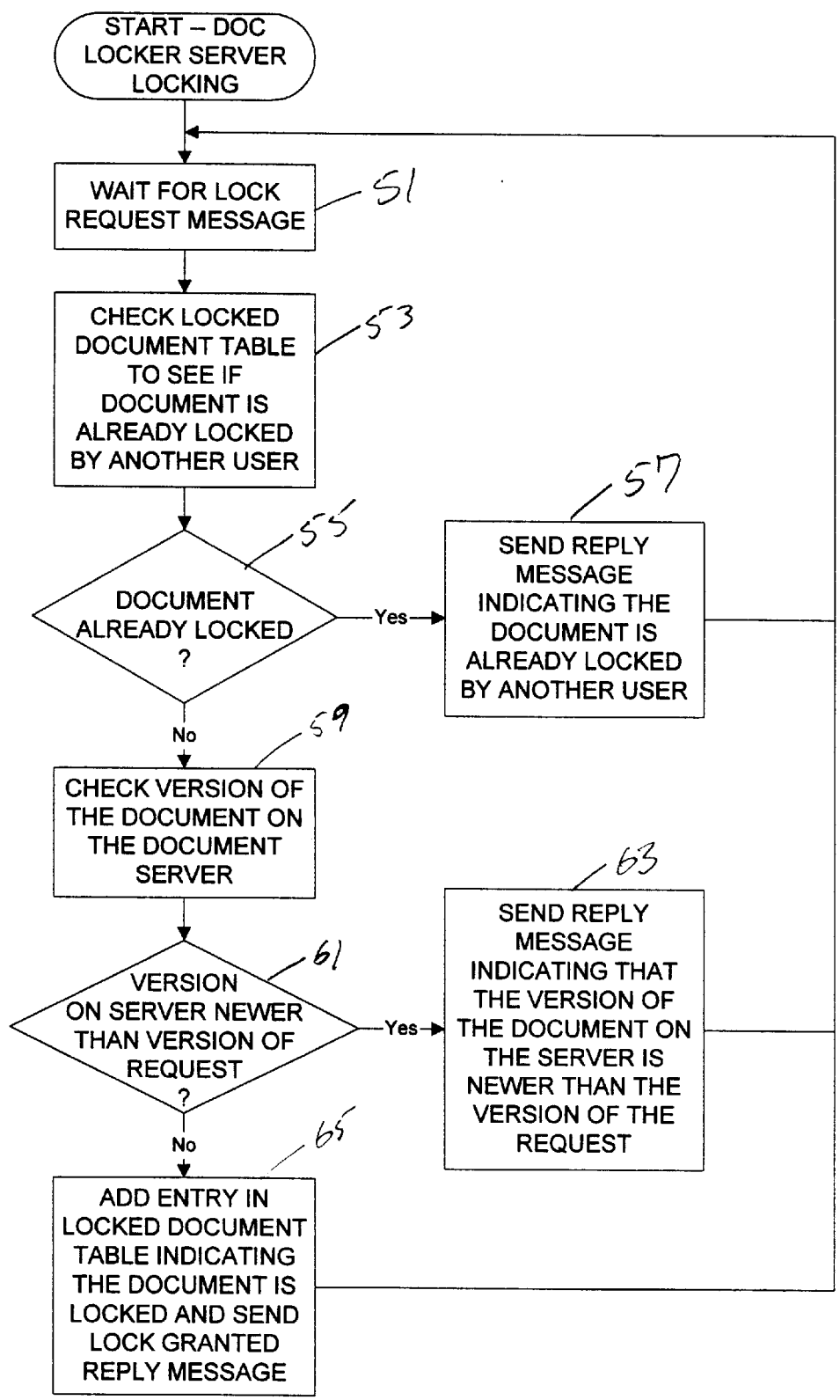
FIG. 3 is a flowchart of document locker server document locking processing according to the present invention.

Referring now to FIG. 3, there is shown a flowchart of document locker server locking processing according to present invention. The document locker server waits for a lock request message, at block 51. When the document locker server receives a lock request message, the document locker server checks a lock to document table that it maintains, or has access to, to see if the document is already locked by another user, at block 53. The locked document table includes, for each locked document, the name of the database upon which the document is a centrally stored, the document identifier, the identity of the user to whom the lock is issued, and the unique lock identifier. If, at decision lock 55, the document is already locked by another user, the document locker server sends a reply message back to the requesting document locker client indicating that the document is already locked by another user, at block 57. The reply message may include the identity of the user to whom the document is locked.

If, at decision block 55, the document is not already locked by another user, the document locking server checks the version identifier of lock request message against the version identifier of the document stored in the document server, at block 59. Preferably, the version identifier is a time stamp that indicates the time of the last local of the document. If, at decision block 61, the version on the document server is newer than the version of the request, the document locking server sends a reply message to the requesting document locking client indicating that the version of the document on the server is newer than the version of request, at block 63. As discussed with respect to FIG. 2, the user may be prompted to replicate the document over the available connection, or cancel the operation. If, at decision block 61, the version on the document server is not newer than the version of the request, then the document locking server adds an entry to the locked document table indicating the document is locked and sends a lock granted message to the requesting document locker client, at block 65. Again, the entry in the locked document table includes the name of the database upon which the document is a centrally stored, the document identifier, the identity of the user to whom the lock is issued, and the unique lock identifier, which is a string that uniquely identifies the lock. The lock granted message includes the lock identifier, which as explained with respect to FIG. 2, the document locker client writes to the locally replicated document.

Figure 4:
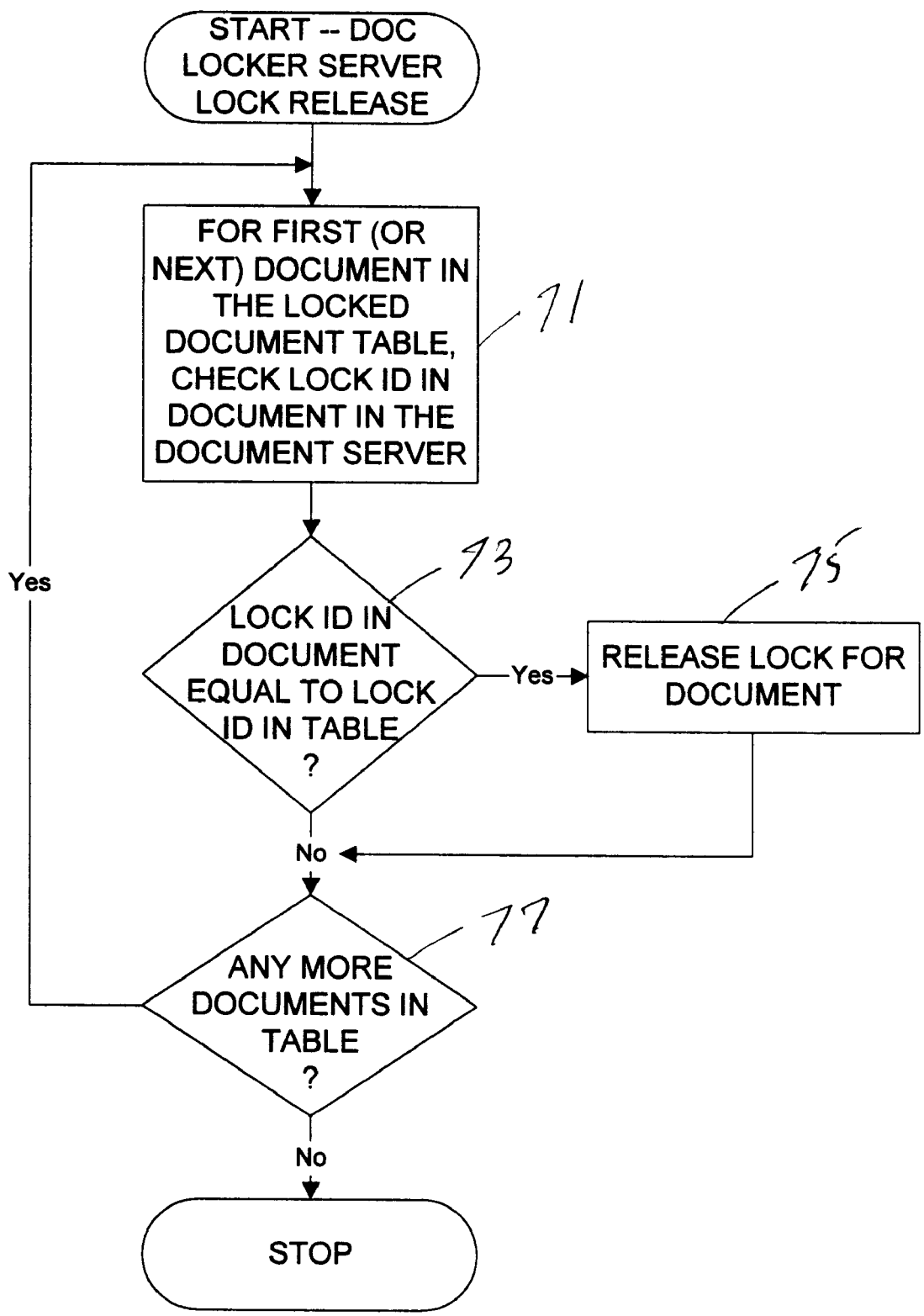
FIG. 4 is a flowchart of document locker server lock release processing according to the present invention.

Referring now to FIG. 4, there is shown a flowchart of document locker server lock release processing according to the present invention. The document locker server performs FIG. 4 processing periodically at a configurable period to determine if a locked document has been replicated back to the document server. The document locker server proceeds through the locked document table by checking lock identifier of the first, or next, document in the locked document table against the lock identifier of the document stored on the document server, at block 71. If, at decision block 73, the lock identifier in the document is the same as the lock identifier in the table, which indicates that a user has checked the document back into the document server, the document locker server releases the lock for the document, at block 75. Preferably, the document locker server releases the lock by deleting the entry for the document in the locked document table. If, at decision lock 73, the lock identifier in the document does not match the lock identifier in the locked document table, then the document locker server tests, at decision block 77, if there are any more documents in the locked document table. If so, processing returns to block 71. If not, FIG. 4 processing ends. Thus, FIG. 4 processing continues until all entries in the locked document table have been checked.

From the foregoing, it may be seen that the present invention provides a method of and system for managing documents that overcomes the shortcomings of the prior art. The present invention solves the local replication and conflict problem. The solution of the present invention is particularly advantageous in limited bandwidth environments. The present invention provides a locking mechanism that uses small messages, thereby using a small amount of bandwidth. If the user requesting a lock has the most recent version of document locally replicated and the document is not already locked by another user, the method and system of the present invention grants a lock without replicating a version to the user, thereby conserving bandwidth.

What is claimed is:

1. A method of managing documents in a distributed computing environment, which comprises the steps of:

monitoring user interaction with a version of a document locally replicated from a server, said document being identified by a document identifier and version identifier;

whenever said user attempts an operation during user interaction with said document that would change said document, requesting a lock for said document by sending a lock request to a document locker server;

determining if said document is already locked for another user by checking a locked document table accessible by said document locker server, said locked document table including, for each locked document, a document identifier, a version identifier, a lock identifier, and an identifier for the user for whom said document is locked;

if said document is not already locked for another user, determining if the version of said document locally replicated is the same as the version of said document stored on said server;

if the version of said document stored on said server is newer than the version locally replicated, informing said user that a newer version of said document exists and prompting said user to replicate said newer version from said server;

if the version of said document locally replicated is the same as the version of said document stored on said server, locking said document by sending a lock including a lock identifier to said user, and placing said lock identifier in said locked document table with the identity of the document being locked;

inserting said lock identifier into said locally replicated document;

allowing said user to perform said operation and to replicate said locally replicated document including said lock identifier to said server if a lock is received; and preventing said user from performing said operation if a lock is not received.

2. The method as claimed in claim 1, including the steps of:

periodically comparing the lock identifier for said document in said locked document table against the lock identifier inserted in the version of said document stored on said server; and;

deleting the entry for said document in said locked document table if said lock identifier for said document in said locked document table matches the lock identifier inserted in the version of said document stored on said server.

3. A system for locking documents in a distributed document management system comprising;

a document server and at least one client machine;

a document locker client on said at least one client machine, said document locker client further comprising:

means for monitoring user operations on a version of a document locally replicated from said document server;

means for sending a lock request message to a document locker server, said lock request message including an identifier for said locally replicated document, said lock request message requesting a lock from said document locker server whenever said user attempts to perform an operation that would change said document;

said document locker server further comprising:

a list of locked documents, said list of locked documents including for each locked document, a document identifier, a version identifier, an identifier for the user by whom said locked document is locked, and a lock identifier;

means for determining if the document identified in said lock request message is a document listed in said list of locked documents to determine whether said locally replicated document is locked by another user;

means for notifying said document locker client that said locally replicated document is locked by another user. means for determining it said version of said locally replicated document is the most recent version of said document;

means for granting a lock if said document is not locked by another user and said locally replicated document is the most recent version of said document, said means for granting a lock including means for making an entry in said list of locked documents, said entry including an identifier for said lock, means for sending a lock granted message to said document locker client, said lock granted message including said identifier for said lock; and wherein said document locker client further comprises:
  means for writing said identifier for said lock in said locally replicated version and allowing said user to perform said operation and to replicate said locally replicated document including said lock identifier to said document server if a lock is received; and
  means for preventing said user from performing said operation if a lock is not received.

4. The system as claimed in claim 3, wherein said document locker server includes means for comparing lock identifiers in said list of locked documents against lock identifiers written in documents on said document server.

5. The system as claimed in claim 4, wherein said document locker server includes means for deleting an entry in said list of locked documents if the lock identifier for said entry matches a the lock identifier in said document on said document server.

* * * * *